United States Patent

Knuutila et al.

[11] Patent Number: 5,624,531
[45] Date of Patent: Apr. 29, 1997

[54] EVAPORATOR OPERATING ON FALLING FILM PRINCIPLE

[75] Inventors: Matti Knuutila, Pori; Kalevi Nurminen, Tampere; Jukka Vaistomaa, Pori; Anssi Mäkelä, Urjala, all of Finland

[73] Assignee: Tampella Power Oy, Tampere, Finland

[21] Appl. No.: 216,722

[22] Filed: Mar. 23, 1994

[30] Foreign Application Priority Data

Apr. 1, 1993 [FI] Finland ................................ 931496

[51] Int. Cl.$^6$ ............................................. B01D 1/22
[52] U.S. Cl. ................ 159/13.3; 159/27.1; 159/43.1; 159/49; 202/236; 165/115
[58] Field of Search ................ 159/28.3, 27.4, 159/13.3, 27.1, 43.1, 49; 203/89; 202/236; 165/115

[56] References Cited

U.S. PATENT DOCUMENTS

| | | | |
|---|---|---|---|
| 3,275,529 | 9/1966 | Kehoe et al. | 159/13.3 |
| 3,366,158 | 1/1968 | Rosenblad | 159/13.3 |
| 3,504,738 | 4/1970 | McGuffey | 119/28.6 |
| 3,595,299 | 7/1971 | Weishaupt et al. | 119/28.5 |
| 3,941,663 | 3/1976 | Steinbruchel | 159/17.4 |
| 4,135,567 | 1/1979 | Matthern | 159/16.3 |
| 4,256,536 | 3/1981 | Tyrtyshny et al. | 159/27.1 |
| 4,810,327 | 3/1989 | Norrmén | 159/13.3 |
| 4,925,526 | 5/1990 | Havukainen | 159/13.3 |
| 4,944,839 | 7/1990 | Rosenblad | 159/49 |
| 5,151,154 | 9/1992 | Hercanou | 159/27.4 |
| 5,246,541 | 9/1993 | Ryham | 159/27.4 |

FOREIGN PATENT DOCUMENTS

| | | | |
|---|---|---|---|
| 1008/70 | 7/1973 | Finland. | |
| 1731248 | 5/1992 | U.S.S.R. | 159/13.3 |
| 1209739 | 10/1970 | United Kingdom. | |
| 8807653 | 10/1988 | WIPO | 159/27.1 |

*Primary Examiner*—Virginia Manoharan
*Attorney, Agent, or Firm*—Dressler, Goldsmith, Milnamow & Katz, Ltd.

[57] ABSTRACT

An evaporator operating on falling film principle, has a shell (1) with a system (2) of evaporating tubes therein, whereby a liquid to be concentrated is fed on the outer surface of the evaporating tube system (2) and vapor is led to flow inside the tubes of the evaporating tube system (2). The evaporating tube system (2) is formed of evaporating elements, each evaporating element being formed of evaporating tubes (9) substantially on the same level. The upper ends of the tubes are connected to a common collecting chamber (8) and the lower end, respectively, to a common collecting chamber (10) in such a manner that there is a connection between both collecting chambers (8, 10) through each tube (9) between them, due to which the collecting chambers (8) of the upper end of the evaporating elements are interconnected through the upper connecting chamber (12), and respectively, the collecting chambers (10) of the lower end are interconnected through the connecting chamber (13) of the lower end.

5 Claims, 2 Drawing Sheets

EVAPORATOR OPERATING ON FALLING FILM PRINCIPLE

The invention relates to an evaporator operating on falling film principle, comprising a shell and a system of evaporating tubes therein, the system comprising vertical evaporating tubes, elements for feeding an agent to be evaporated on the evaporating tubes in such a way that it flows down along the evaporating tubes and forms a film on the outer surface thereof, and heating vapor inlet and outlet channels connected to the inner portion of the evaporating tubes.

Evaporators operating on falling film principle have been used generally for a long time already for the concentration of liquids. In these evaporators, a liquid is allowed to flow as a film generally along the inner surface of heating tubes and the outer surface of the tubes is heated by vapor, due to which the heat of the vapor causes water to evaporate from the liquid to be concentrated and to flow as vapor into a collecting chamber and further as vapor out of the collecting chamber. Correspondingly, the concentrated liquid flows along the tubes downwards into a collecting chamber and out of there through a separate channel. The vapor used for heating is at least partly condensed into water and discharged as a condensate through a separate channel. The remaining vapor again is exhausted separately through a particular outlet channel for vapor.

In known solutions, the equipment is typically implemented in such a way that tubes forming a heating surface are fastened at their ends between so-called tube plates. The tube plates have holes for the tube ends and form partition walls between a feed chamber for a liquid to be concentrated, a vapor chamber and a collecting chamber for concentrated liquid, respectively. Such a solution is known from the Finnish Patent 71 067, for example.

From the Finnish Patent 76 699 again is known a solution, in which the evaporating tubes are formed of two tubes within each other in such a manner that the upper end of the outer tube is closed and vapor is caused to pass along the surface between the tubes and to return through the inner tube. On the other hand, the liquid to be concentrated is fed outside the tubes. Also in this solution, a pressure resistant tube plate is required for the tubes, and because of the tubes being within each other, dimensioning and installation shall be very accurate.

When high dry contents are strived for, a problem with the known solutions is that hot vapor must be utilized for providing a sufficient temperature, due to which the outer casing of the evaporator is exposed to a high vapor pressure. Because of this, the casing must be made of a thick material and the whole structure of the evaporator must be very solid, which means higher manufacturing costs. Further, in a solution in which liquor is caused to pass through the tubes, dirt collected on the inner surface of the tubes may come loose as pieces and block the tube so that the tubes cannot be cleaned successfully in a typical way with a wash liquid any more, the result of which is that the evaporating capacity of the equipment decreases. Moreover, the manufacture of tube plates according to the known solutions demands great precision and the manufacturing costs therefor are high.

The object of the present invention is to provide an evaporator by means of which the above drawbacks are avoided and which is simple to manufacture and also to clean, if necessary. The evaporator according to the invention is characterized in that the evaporating tube system is formed of a plurality of parallel evaporating elements.

An essential idea of the invention is that evaporating elements are formed of evaporating tubes preferably in such a way that the upper ends of the evaporating tubes and the lower ends, respectively, are interconnected preferably by means of tubular collecting chambers. The invention is further characterized in that a plurality of evaporating elements formed of parallel evaporating tubes preferably on the same level are installed in parallel in the same evaporator. A preferred embodiment of the invention is further characterized in that the collecting chambers of the separate evaporating elements are interconnected in such a way that the collecting chambers at the upper end of the tubes, on the one hand, and the collecting chambers at the lower end of the tubes, on the other hand, are interconnected preferably by means of a tubular connecting chamber or possibly a connecting chamber of some other shape. Another essential idea of the invention is that a liquid to be concentrated is fed through a distributing basin at the upper end of the evaporating tubes on the outer surface thereof and vapor is fed through the collecting chambers inside the evaporating tubes preferably from the upper end downwards, and correspondingly, the condensate generated is discharged from the collecting chambers at the other end as well as the remaining vapor as vapor, both preferably through separate channels or through a common channel. Vapor may be fed also from below, in which case the condensate is collected from below and the remaining vapor from above.

An advantage of an evaporator according to the invention is that it is easy and simple to manufacture, because it is formed of a plurality of parallel evaporating elements manufactured in the same way. Since the elements can be supported only at one end, no thermal strains to be compensated for arise, even though the heating surface tubes and the shell were made of different materials. Further, the tube system of the evaporator according to the invention is not easily blocked, because only vapor and condensation water pass through the evaporating tubes. In addition, the structure according to the invention can be made relatively light, because only those evaporating elements which contain vapor have a high pressure. The wall thickness of the evaporating tubes of these elements can be selected in a desired manner without the thickness of the remaining part of the evaporator, e.g. of the shell, being affected thereby. Moreover, the heating surfaces of the evaporator according to the invention are easy to clean, if needed, because possible dirt from liquor or some other liquid, fastened to the heating surfaces, is situated on the outer surface of the evaporating tubes and the evaporator may thus be cleaned in a generally known manner by dissolving or for instance by means of a pressure washer or some other similar device without the tube system having to be rinsed inside.

The invention will be described in more detail in the attached drawings, in which

DESCRIPTION OF THE PREFERRED EMBODIMENTS

Figure 1:
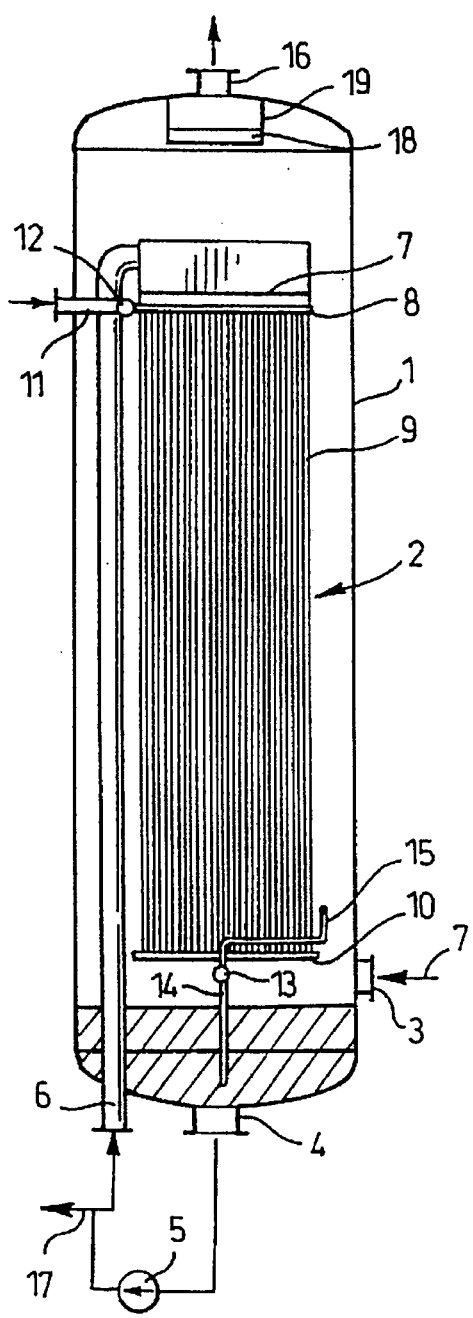
FIG. 1 shows schematically an evaporator according to the invention, in section parallel with evaporating elements.
Figure 2:
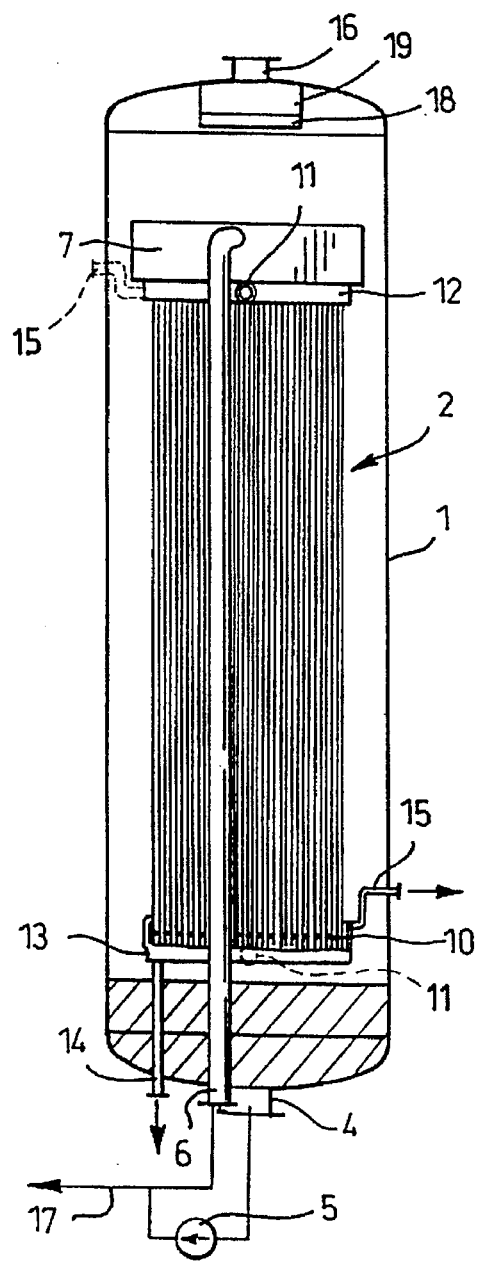
FIG. 2 shows the evaporator according to the invention in cross-section with respect to the evaporating elements.

FIGS. 1 and 2 illustrate schematically an evaporator according to the invention in section parallel with evaporating elements, on the one hand, and in cross-section with respect to the evaporating elements, on the other hand. The evaporator comprises a shell 1 containing a system 2 of evaporating tubes formed of evaporating elements similar to those to be shown schematically in FIG. 3 later. A liquid to be concentrated, in this case black liquor, is fed through a connection 3 into the shell 1, to the bottom thereof. Liquor is discharged from the bottom of the evaporator through an outlet connection 4 and part of it is pumped by means of a schematically shown pump 5 through a circulating tube 6 into a distributing basin 7 above the evaporating tube system 2, from which basin it flows substantially evenly on collecting chambers 8 of the evaporating elements and from there further along the surface of separate evaporating tubes 9 downwards. The use of the invention is in no way restricted to black liquor, but it can also be used for the evaporation of other liquids. At the lower end of the evaporating tubes 9, the concentrated black liquor flows along the surface of collecting chambers 10 of the lower end and falls subsequently into the liquor in the lower part of the shell 1 and mixes therewith. To provide evaporation, vapor is led through the evaporating tubes 9 and it is fed in through an inlet channel 11 in the upper part of the evaporating tube system 2. From there the vapor enters firstly a connecting chamber 12, which is connected to the upper collecting chambers 8 of the evaporating elements, so that the vapor is distributed through these evenly to all evaporating tubes 9. Correspondingly, the remaining part of the vapor and condensate are collected, after having passed through the evaporating tubes 9, in the collecting chambers 10 of the lower end of the evaporating elements, these collecting chambers being connected to a lower connecting chamber 13. From the lower part of the lower connecting chamber 13 starts an outlet channel 14 for condensate, through which channel the condensate is discharged, and respectively, from the upper part of the connecting chamber 13 starts an outlet channel 15 for vapor, through which channel the remaining heating vapor is exhausted. The water discharged from the black liquor under the influence of heating is exhausted as vapor through an outlet connection 16 at the upper end of the shell 1, and respectively, the concentrated liquor is discharged through a schematically shown distributing channel 17. Inside the evaporator, in front of the outlet connection 16, there is further a mist separator 18 formed of lamellar sheets shown in FIG. 4 in such a way that water or liquor drops possibly contained in the exhaust vapor hit the lamellar and flow down along these. The mist separator is mounted to be enclosed by a closed housing 19 on each side so that all exhaust vapor has to flow through the mist separator 18. Other known mist separator structures may be used as well in this evaporator.

Figure 3A:
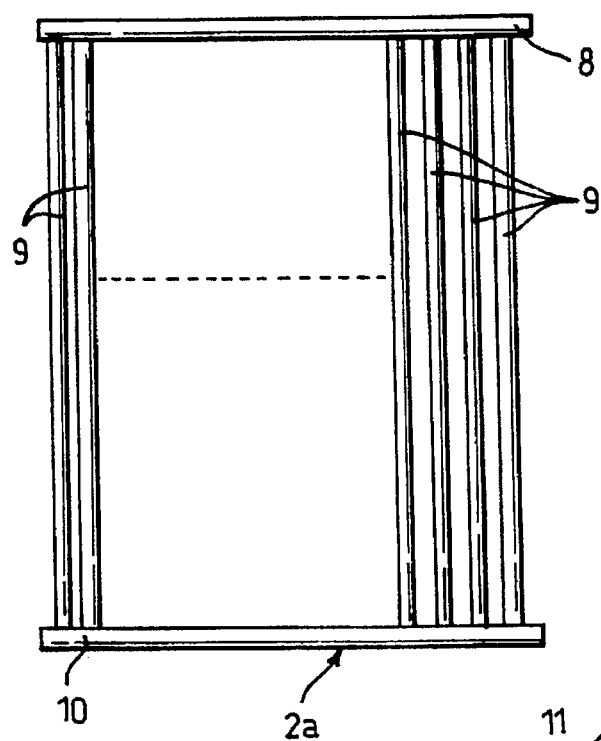
FIGS. 3a and 3b show schematically a side and edge view of an evaporating element according to the invention and FIG. 4 shows schematically a perspective section view of an embodiment of the evaporator according to the invention.
Figure 3B:
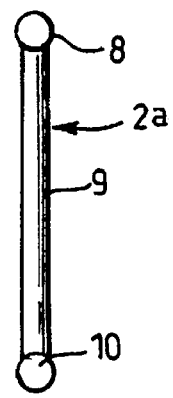

FIGS. 3a and 3b show schematically an evaporating element 2a of an evaporator according to the invention in side and edge view, respectively. The evaporating element 2a comprises an upper collecting chamber 8, evaporating tubes 9 and a lower collecting chamber 10. A single evaporating element 2a is, as shown in FIG. 3b, preferably a flat planar evaporating element formed of parallel evaporating tubes at a distance from each other, with each tube 9 connected to the collecting chambers 8 and 10, respectively, so that there is a connection between the collecting chambers 8 and 10 through each evaporating tube. The evaporating tubes 9 can be fastened to the collecting chambers 8 and 10 e.g. by welding or by some other suitable fastening method. The collecting chambers 8 and 10 are preferably tubular, which makes it possible to provide easily a structure as pressure resistant as possible. Since the evaporating elements 2a resist high pressure, high vapor temperatures, and consequently, high pressures can be used for the evaporation without the whole evaporator having to resist high pressure. Then the structure of the whole evaporator can be made relatively light, and to that part, the manufacturing costs lower than those of the known solutions. Correspondingly, no expensive accurately machined tube plates are required for the manufacture of the evaporating element 2a, but this element can be assembled easily of tubular parts.

The evaporator according to the invention is simple to construct and its evaporating elements 2a are easy to manufacture, while the number of evaporating elements 2a and the number of evaporating tubes in one element may be selected as per needed. Since vapor passes inside the evaporating tubes 9, these are not blocked under the influence of the solution to be concentrated, such as liquor. Furthermore, the outer surfaces of the evaporating tubes 9 are easy to clean in a generally known manner by dissolving or for example by means of a pressure washer or some other similar device, if necessary, because between the tubes there are in practice such slits that enable an access to all surfaces in this way.

Figure 4:
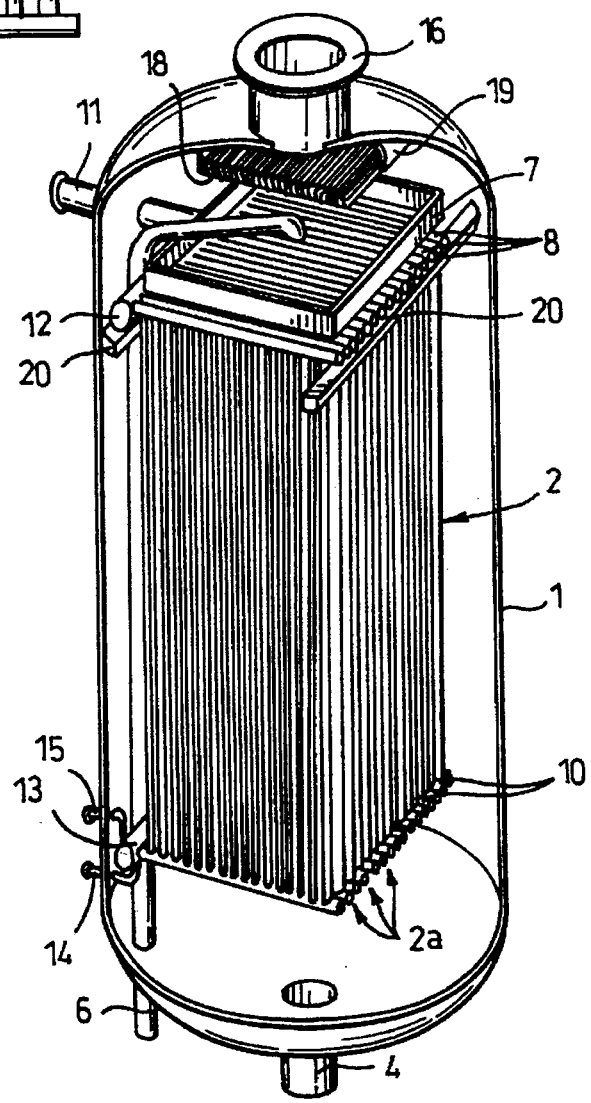

FIG. 4 shows schematically one embodiment of the evaporator according to the invention in perspective section. This figure is an illustrative presentation of how the evaporating tube system 2 is formed by positioning evaporating elements 2a in parallel so as to form a structure of square cross-section, for instance. The evaporating tube system 2 is suspended in place with respect to the shell 1 of the evaporator by using the collecting chambers 8 at the upper end of the elements 2a to support the tube system on holders 20 fastened to the shell 1. For this purpose, the length of the collecting chambers 8 is dimensioned so that both ends thereof extend outside the outermost evaporating tubes 9 of the evaporating elements 2a and thus on the holders 20. Correspondingly, the upper connecting chamber 12 is supported by one of the holders 20. In this embodiment, the lower connecting chamber 13 is mounted at one end of the lower collecting chambers 10, while it was mounted in the middle part of the collecting chambers 10, below them, in the embodiment of FIG. 1. The location of the connecting chamber 13 may thus be selected in a desired manner, which is not of essential importance to the operation of the evaporator. Identical reference numerals are used in FIG. 4 for identical parts in the previous figures, and as to those parts, they are not explained in more detail.

In the above specification and the drawings, the invention has been set forth only by way of examples and it is in no way restricted thereto. The evaporating elements may be assembled in various manners according to the pressure to be used and dimensioned for each need separately. Except for being tubular, the collecting chambers 8 and 10 may also have another shape. The connecting chambers 12 and 13 may be connected in various manners to the collecting chambers 8 and 10, respectively, either to the ends thereof or to the middle, depending on the situation. Further, the vapor may be fed and exhausted, except in the previously described manner to the upper end of the evaporating tube system through the connecting chamber 12 and from the lower end of the evaporating tube system through the connecting chamber 13, also in the opposite direction. As shown in dashed lines in FIG. 2, the vapor inlet channel 11 may be thus connected to the connecting chamber 12 at the lower end of the evaporating tube system 2 with the vapor outlet channel 15 connected to the connecting chamber 12 at the upper end of the evaporating tube system. Then the vapor is fed into the connecting chamber 13 at the lower end of the tubes and it flows from below upwards through the tubes 9 into the upper collecting chamber and from there further into the upper connecting chamber 12, from where it is exhausted. Also in an embodiment, in which a separate inlet and outlet channel lead from each element outside the evaporator, the vapor may be fed to the lower end of the elements and exhausted from the upper end thereof. The simplest way of discharging the condensate is to discharge it from the lower end of the evaporating elements. Liquor or some other liquid to be evaporated may be fed, as shown in the FIGS. 1 and 2, to the bottom of the evaporator, or alternatively, directly into the distributing basin 7. The liquor or other liquid to be evaporated may be discharged from the bottom of the shell 1 of the evaporator and circulated either in the manner shown in the figures or by taking the liquid to be circulated separately from the upper part of the liquid layer in the bottom of the shell 1, for instance. The evaporating elements may be supported, except by suspending from the upper part, also to stand on their lower part, in which case holders corresponding to the holders 20, for example, are arranged to be supported by the chamber and the elements are positioned on such holders in order to stand on their collecting chambers, for instance.

We claim:

1. A falling film evaporator comprising a shell and a system mounted within the shell and formed of a plurality of parallel evaporating elements, each of which evaporating elements comprises a plurality of vertical evaporating tubes interconnected so as to form a unitary structure separate from the other evaporating elements within the same shell, the evaporator further comprising means for feeding an agent to be evaporated on the evaporating tubes in such a way that the agent flows down the evaporating tubes and forms a film on the outer surfaces of the evaporating tubes, and heating vapor inlet and outlet channels connected to the inner portions of the evaporating tubes, wherein each evaporating element comprises a plurality of said evaporating tubes parallel to each other and spaced at a distance from each other, the evaporating tubes of each evaporating element are interconnected at their upper and lower ends, respectively, by collecting chambers communicating with the evaporating tubes of each evaporating element, the heating vapor inlet and outlet channels are connected to the collecting chambers, a connecting chamber is provided at each end of an evaporating tube system, the collecting chamber of each evaporating element is connected to the connecting chamber at the same end, and the inlet and outlet channels for heating vapor are connected to the collecting chambers via the connecting chambers.

2. A falling film evaporator according to claim 1, wherein one of the heated vapor inlet and outlet channels is connected to the connecting chamber at the upper end of the evaporating tube system for feeding vapor through the evaporating tubes from above downwards, and another of the heated vapor inlet and outlet channels is connected to a lower part of the evaporator tube system for discharging condensate generated from the vapor, and further another of the heated vapor inlet and outlet channels is connected to a lower part of the evaporator tube system for exhausting condensed vapor.

3. A falling film according to claim 1, wherein one of the heated vapor inlet and outlet channels is connected to the connecting chamber at the lower end of the evaporating tube system for feeding vapor through the evaporating tubes from below upwards, and another of the heated vapor inlet and outlet channels is connected to a lower part of the evaporator tube system for discharging condensate generated from the vapor, and further another of the heated vapor inlet and outlet channels is connected to the connecting chamber at the upper end of the evaporating tube system for exhausting condensed vapor.

4. A falling film evaporator according to claim 1, wherein the evaporating tube system formed of the evaporating elements is mounted so as to be suspended from the upper end of said system and so as to be supported by holders fastened to the shell.

5. A falling film evaporator according to claim 4 wherein the collecting chambers at the upper ends of the evaporating elements are provided with such lengths that one end of each of the collecting chambers at the upper ends of the evaporating elements extends onto one of the holders and the collecting chambers at the upper ends thereof are transverse to the shell with the evaporating tube system suspended and supported by the collecting chambers at the upper ends thereof.

* * * * *

UNITED STATES PATENT AND TRADEMARK OFFICE
CERTIFICATE OF CORRECTION

PATENT NO. : 5,624,531
DATED : April 29, 1997
INVENTOR(S) : Knuutila et al.

It is certified that error appears in the above-identified patent and that said Letters Patent is hereby corrected as shown below:

Column 3, line 46, "lamellar" should be --lamellas--.

Signed and Sealed this

Fourteenth Day of October, 1997

Attest:

BRUCE LEHMAN

Attesting Officer     Commissioner of Patents and Trademarks